(12) United States Patent
Elwell (10) Patent No.: US 9,144,142 B2
(45) Date of Patent: Sep. 22, 2015

(54) REDUCED TIME DELAY FOR OUTPUTS OF AN OCCUPANCY SENSOR

(75) Inventor: Brian Eugene Elwell, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 630 days.

(21) Appl. No.: 13/463,331

(22) Filed: May 3, 2012

(65) Prior Publication Data

US 2013/0297073 A1    Nov. 7, 2013

(51) Int. Cl.
*H05B 37/02* (2006.01)
*H04L 12/841* (2013.01)
*G01S 15/04* (2006.01)
*F24F 11/00* (2006.01)

(52) U.S. Cl.
CPC ............ *H05B 37/0245* (2013.01); *H04L 47/28* (2013.01); *H05B 37/0227* (2013.01); *H05B 37/0281* (2013.01); *F24F 11/0034* (2013.01); *G01S 15/04* (2013.01); *Y02B 20/42* (2013.01)

(58) Field of Classification Search
CPC ........ Y02B 20/44; Y02B 20/46; Y02B 20/48; Y02B 20/42; Y02B 60/1242; Y02B 60/1246; Y02B 60/1267; Y02B 60/1289; Y02B 90/241; Y02B 90/245
USPC ............. 700/286, 291, 295, 300; 340/539.22, 340/539.26, 539.3, 522, 527, 567, 573.1, 340/565, 554, 561
See application file for complete search history.

(56) References Cited

U.S. PATENT DOCUMENTS

| | | | |
|---|---|---|---|
| 6,789,151 B1* | 9/2004 | Benson et al. | 710/305 |
| 7,411,489 B1 | 8/2008 | Elwell et al. | |
| 8,111,131 B2 | 2/2012 | Zaveruha et al. | |
| 2002/0175815 A1 | 11/2002 | Baldwin | |
| 2007/0182581 A1* | 8/2007 | Elwell | 340/825.36 |
| 2012/0147705 A1* | 6/2012 | Hick | 367/93 |
| 2012/0296487 A1* | 11/2012 | Leinen et al. | 700/296 |

OTHER PUBLICATIONS

International Search Report and Written Opinion for PCT/US2013/039491 mailed on Aug. 8, 2013.

* cited by examiner

*Primary Examiner* — Darrin Dunn
(74) *Attorney, Agent, or Firm* — King & Spalding LLP (57) ABSTRACT

One or more switches in an occupancy sensor are enabled. When a switch is enabled, a reduction timer measuring a reduction time delay is initiated when an occupancy condition is detected by an occupancy sensor. In addition, one or more outputs controlled by the reduction timer are activated so that a signal is sent to a control system to notify the control systems of the occupancy condition. When the reduction time delay expires, the outputs of the occupancy sensor that are controlled by the reduction timer are deactivated, and so the outputs cease sending the signal to the control system. As a result, the control systems initiate their own internal time delays sooner.

20 Claims, 4 Drawing Sheets

REDUCED TIME DELAY FOR OUTPUTS OF AN OCCUPANCY SENSOR

TECHNICAL FIELD

The present disclosure relates generally to occupancy sensing, and more particularly, to reducing one or more time delays for outputs of an occupancy sensor.

BACKGROUND

Occupancy sensors are used to detect occupancy in a space of interest, such as a room, hallway, warehouse, other large open areas, or any portion thereof. When occupancy within the space is detected by the occupancy sensor, it sends a signal to a controller, such as a power pack, which performs a function in response to the signal. Example of the functions performed include, but are not limited to turning on lights in the room or adjusting a thermostat. The occupancy sensors may use infrared technology, ultrasonic technology, some other technology, and/or any suitable combination thereof to detect occupancy in the space At times, when occupancy is no longer detected in the space, the occupancy sensor sends a different signal to the controller to notify the controller that the space is no longer occupied. To help avoid a false-off situation (i.e., turning off power to one or more devices when such devices still require power because the space is, in fact, still occupied), a time delay is built into the occupancy sensor before sending the signal notifying the controller that the space is no longer occupied.

SUMMARY

In general, in one aspect, the disclosure relates to a method for reducing a time delay for an output of an occupancy sensor. The method can include receiving a first setting for a reduction timer, and detecting, with the occupancy sensor, an occupancy condition within a space. The method can also include initiating the reduction timer and an internal timer based on the detection of the occupancy condition, where the reduction timer measures a reduction time period, and where the internal timer measures an internal time period. The method can further include activating, during the reduction time period, a power pack output, and deactivating, when the reduction time period expires, the power pack output.

In another aspect, the disclosure can generally relate to a method for adjusting a time delay for an output of an occupancy sensor. The method can include providing a reduction timer, and providing an internal timer. The method can also include receiving a first setting of a switch, and detecting, with the occupancy sensor, a first occupancy condition within a space. The method further can include initiating, based on the first setting of the switch and on detecting the first occupancy condition within the space, the reduction timer, where the reduction timer measures a reduction time period. The method can also include activating, during the reduction time period, a power pack output, and deactivating, when the reduction time period expires, the power pack output.

In yet another aspect, the disclosure can generally relate to an occupancy sensor. The occupancy sensor can include a housing, and a processor disposed within the housing. The occupancy sensor can also include a sensor communicably coupled to the processor and at least partially disposed within the housing, and a first switch disposed within the housing and communicably coupled to the processor, said first switch comprising a first position and a second position. The occupancy sensor can further include a reduction timer disposed within the housing and communicably coupled to the processor, where the reduction timer is enabled when the first switch is in the first position and disabled when the first switch is in the second position. The occupancy sensor can also include an internal timer disposed within the housing and communicably coupled to the processor and configured to measure an internal time period starting when the occupancy condition is detected by the sensor. The occupancy sensor can further include a power pack output disposed within the housing and communicably coupled to the processor.

These and other aspects, objects, features, and embodiments will be apparent from the following description and the appended claims.

BRIEF DESCRIPTION OF THE DRAWINGS

The drawings illustrate only exemplary embodiments of reduced time delay for outputs of an occupancy sensor and are therefore not to be considered limiting of its scope, as reduced time delay for outputs of an occupancy sensor may admit to other equally effective embodiments. The elements and features shown in the drawings are not necessarily drawn to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION OF EXEMPLARY EMBODIMENTS

Exemplary embodiments of reduced time delay for outputs of an occupancy sensor will now be described in detail with reference to the accompanying figures. Like, but not necessarily the same or identical, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description.

The occupancy sensors described herein may be a standalone unit in a space, one of a number of occupancy sensors in a space, or one of a number of occupancy sensors in a network of spaces. The exemplary occupancy sensors detect one or more occupancy conditions. An occupancy condition is any event that may signify occupancy and/or a lack of occupancy of a space. For example, an occupancy condition can be detecting heat generated by a person in a space. As another example, an occupancy condition can be detecting a lack of movement in the space.

Figure 1:
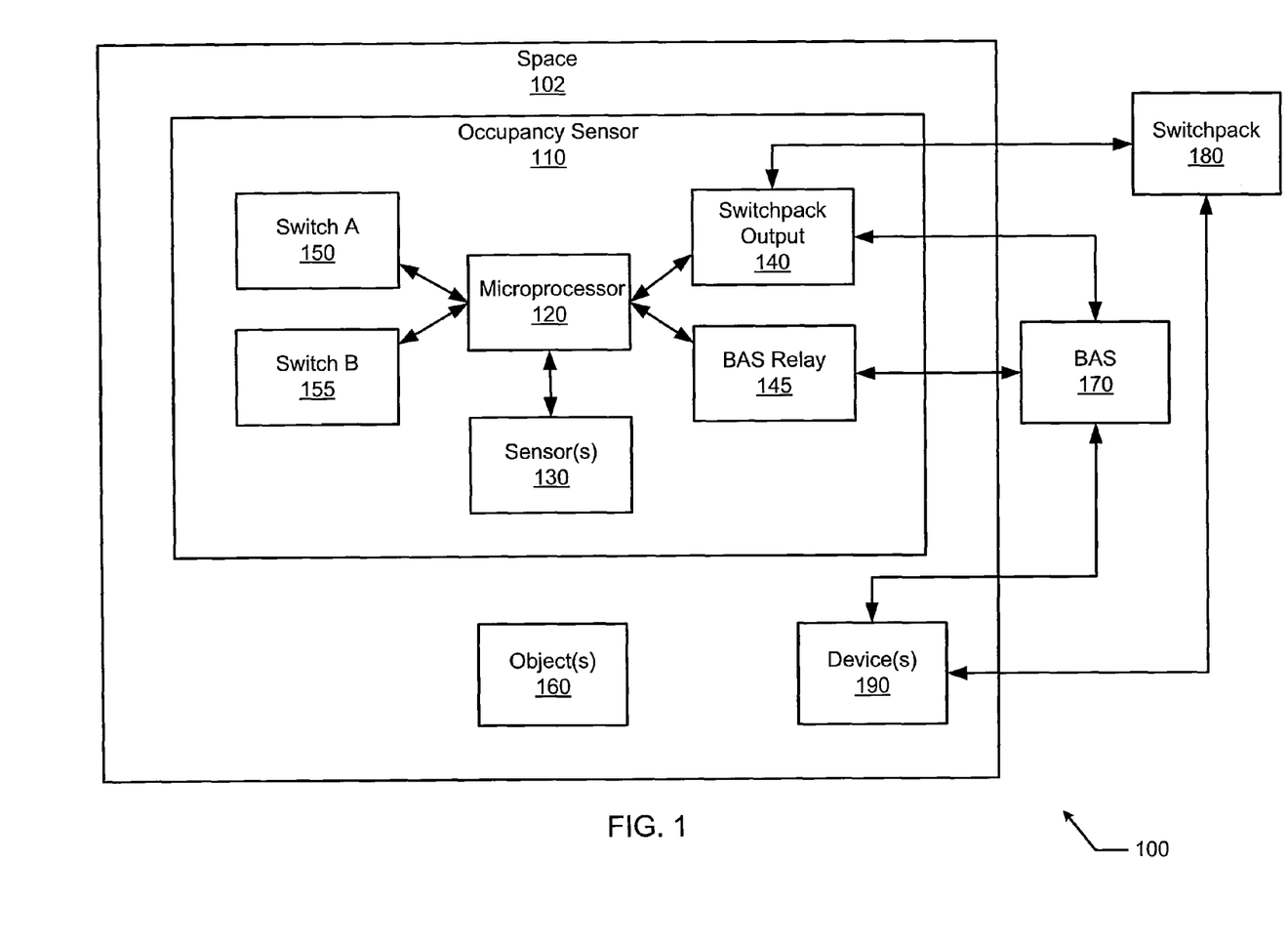
FIG. 1 shows a diagram of an exemplary system that includes reduced time delay for outputs of an occupancy sensor in accordance with one or more exemplary embodiments.

FIG. 1 is a diagram of a system 100 for use with reduced time delay for outputs of an occupancy sensor in accordance with certain exemplary embodiments. Referring now to FIG. 1, the exemplary system 100 includes an occupancy sensor 110, one or more devices 190, and one or more objects 160 located within a space 102, a building automation system (BAS) 170, and a power pack 180. In one exemplary embodiment, the occupancy sensor 110 includes a microprocessor 120, one or more sensors 130, a power pack output 140, a BAS relay 145, a switch A 150, and a switch B 155. Each of these components is described below. Each of these components can be positioned within a housing of the occupancy sensor 110. Alternatively, one or more components can be positioned with outside of, but communicably coupled to, the housing of the occupancy sensor 110.

Referring to FIG. 1, the space 102 is any area that may be occupied by one or more people. The space 102 can be within a structure (e.g., building, office, garage) or outside of a structure. In certain exemplary embodiments, the space 102 includes one or more objects 160. The objects 160 can be boundaries of the space 102, such as a wall, floor ceiling, door, or window. Each object 160 can also, or in the alternative, be any fixture, such as a lighting device in the space 102 and/or article within the space 102. In certain alternative embodiments, the object 160 can be animate or inanimate.

The exemplary devices 190 are any device that consumes energy and is used within the space 102 when people are present in the space 102. Examples of a device 190 include, but are not limited to, luminaires, fans, air conditioners, monitors, motors, contactors, and security sensors. Each device 190 is capable of being controlled by the power pack 180 (also called by other names, including but not limited to a control panel, a master control panel, a relay panel, a master controller, and a controller) and/or the BAS 170. In some exemplary embodiments, the device 190 is also an object 160.

In certain exemplary embodiments, the occupancy sensor 110 is a device that detects an occupancy condition within the space 102. The exemplary occupancy sensor 110 includes an enclosure or similar housing made of one or more appropriate materials and shaped in such a way as to enclose the components of the occupancy sensor 110, some of which are described herein. The occupancy sensor 110 is communicably coupled to the power pack 180 and the BAS 170. When an occupancy condition is detected in the space 102, the occupancy sensor 110 sends a signal to a control circuit (e.g., the power pack 180, the BAS 170), which controls one or more devices 190 within the space 102 that consume energy. The occupancy sensor 110 is positioned at a location in the space where the occupancy sensor 110 can detect an occupancy condition in various portions of the space 102.

An occupancy condition is detected by the occupancy sensor 110 using certain exemplary sensors 130. Each exemplary sensor is communicably coupled to the microprocessor 120. A sensor 130 uses one or more types of sensing technology to generate a signal that indicates an occupancy condition (i.e., whether the space 102 is occupied). A sensor 130 may operate continuously, on a random basis, on a periodic basis, or any suitable combination thereof. There are various types of sensing technologies for a sensor 130. Examples of sensing technologies for a sensor 130 include ultrasonic, infrared, microwave, and microsonic. A type of sensing technology may include multiple categories. For example, infrared technology may include passive infrared (PIR). A sensor 130 may use one or more sensing technologies. For example, a sensor 130 is capable of using both ultrasonic and infrared technologies.

A sensor 130 using infrared (e.g., PIR) technology (also called a PIR sensor 130) senses the difference in heat emitted by an object (e.g., humans) in motion from the ambient temperature of the space 102. A sensor 130 that uses PIR technology can detect motion within a field of view that requires a line of sight. Such PIR sensors 130 cannot "see" through obstacles, and so PIR sensors 130 can have limited sensitivity to minor (e.g., head nodding) movement beyond certain distances (e.g., 15 feet.) from the PIR sensor 130. A sensor 130 using PIR technology is sensitive to movement laterally across the field of view of the PIR sensor 130. The field of view of a PIR sensor 130 can be adjusted.

In certain exemplary embodiments, a PIR sensor 130 generally performs more accurately in smaller, enclosed spaces (for example, as a wall switch sensor), in spaces where the PIR sensor 130 has a view of the activity (ceiling- and wall-mounted sensors), in outdoor areas, and in warehouse aisles. A PIR sensor 130 tends to be less effective in certain other applications, including but not limited to when there are low motion levels in the space, when one or more obstacles block the view of the PIR sensor 130, when the PIR sensor 130 (and so the occupancy sensor 110) is mounted on sources of vibration, and when the PIR sensor 130 is mounted within a certain distance (e.g., 6-8 feet) of HVAC air diffusers.

A sensor 130 using ultrasonic technology (also called an ultrasonic sensor 130) uses the Doppler principle to detect occupancy by emitting an ultrasonic high-frequency signal throughout the space 102, sensing the frequency of the reflected signal, and interpreting a change in frequency as motion in the space 102. An ultrasonic sensor 130 generally does not require a direct line of sight and instead can "see" around corners and objects. Ultrasonic sensors 130 are more effective for low motion activity, with high sensitivity to minor (e.g., hand) movement, up to certain distances (e.g., 25 feet). Ultrasonic sensors 130 typically have a larger coverage area than PIR sensors 130. The view of an ultrasonic sensor 130 cannot be adjusted.

Ultrasonic sensors 130 tend to perform well in certain applications, including but not limited to open spaces 102, spaces 102 with obstacles, restrooms, and spaces 102 with hard surfaces. Ultrasonic sensors 130 tend to be less effective in certain other applications, including but not limited to spaces 102 with high ceilings (e.g., greater than 14 feet), spaces 102 with high levels of vibration or air flow (which can cause nuisance switching), and open spaces 102 that require selective coverage (such as control of individual warehouse aisles).

Certain exemplary occupancy sensors 110 use both infrared (e.g., PIR) and ultrasonic technologies. In such a case, the occupancy sensor 110 may only send a signal to activate the lights in the space 102 when both technologies (PIR and ultrasonic) are triggered (e.g., detect an occupancy condition in the space 102). Using both technologies in an occupancy sensor 102 can significantly reduce the possibility of a false-on situation (e.g., sending a signal to turn on lights in the space 102 when the space 102 is unoccupied). Further, requiring either one of the two technologies to hold the lights on may significantly reduce the possibility of a false-off situation (e.g., sending a signal to turn off lights in the space 102 while the space 102 is still occupied).

Regardless of the sensing technology used by a sensor 130, the sensor 130 may operate in a certain manner (e.g., send a signal to the microprocessor 120, cease sending a signal to the microprocessor 120) based on one or more occupancy conditions. For example, the sensor 130 sends a signal to the microprocessor 120 when the sensor 130 detects that an occupancy condition exists in the space 102. As another example, the sensor 130 ceases sending a signal to the microprocessor 120 when the sensor 130 detects that an occupancy condition exists in the space 102. As yet another example, the sensor 130 sends a signal to the microprocessor 120 when the sensor 130 detects that an occupancy condition ceases to exist in the space 102. For another example, the sensor 130 ceases sending a signal to the microprocessor 120 when the sensor 130 detects that an occupancy condition ceases to exist in the space 102. In certain exemplary embodiments, each signal sent by the sensor 130 to the microprocessor 120 is different to designate a different occupancy condition.

In addition to the sensors 130, the exemplary microprocessor 120 is communicably coupled to the switch A 150, the switch B 155, the power pack output 140, and the BAS relay 145. The exemplary microprocessor 120 receives one or more signals from one or more components (e.g., sensor 130, switch A 150) within the occupancy sensor 110, processes such signals according to firmware installed on the microprocessor 120, and generates signals that are sent to one or more components within the occupancy sensor 110 and/or external to the occupancy sensor 110. In certain exemplary embodiments, the microprocessor 120 includes one or more timers (not shown). Each timer keeps clock time and/or tracks one or more periods of time, such as a time delay, a fixed period of time, or a running occupancy time. The exemplary timer is able to track one or more time periods concurrently.

The exemplary timer communicates times to the microprocessor 120. The timer also receives instructions from the microprocessor 120 to start tracking one or more time periods and/or time delays. For example, the timer notifies the microprocessor 120 when a certain amount of time has lapsed, such as the time delay of a reduction timer and the time delay of an internal timer. Each timer may be a physical timer, separate from the microprocessor 120, or software/firmware installed on the microprocessor 120.

In certain exemplary embodiments, a time delay is associated with an amount of time during which a device 190 is activated and/or maintained in an active state in response to an occupancy condition (occupancy and/or lack of occupancy) of the space 102. For example, a time delay is an amount of time that the occupancy sensor 110 waits, after detecting occupancy in the space 102, before sending a signal that the space 102 is unoccupied. As another example, a time delay is an amount of time that the occupancy sensor 110 waits, after ceasing to detect occupancy in the space 102, before sending a signal that the space 102 is unoccupied. As yet another example, a time delay is an amount of time that the occupancy sensor 110 waits after a signal that the space 102 is still occupied ceases to be sent.

Various types of timers are capable of use within the microprocessor 120 or other portions of the occupancy sensor 110. In certain exemplary embodiments, time delays that are associated with an amount of time that a signal from a particular sensor has started and/or ceased are called internal time delays measured by internal timers. The internal time delay for each sensor 130 can vary. For example, the internal time delay for a PIR sensor 130 may be longer than the internal time delay for an ultrasonic sensor 130. Further, a grace timer is capable of us in conjunction with internal timers to run a grace time delay in case of inadvertent shutoff (false-off) of devices. For example, if an occupation condition is detected by a sensor 130, but an internal timer associated with the sensor 130 has not started, the grace timer is used to start a time delay.

Time delays associated with reducing the time delay for outputs (e.g., the power pack output 140, the BAS relay 145) of the occupancy sensor 110 used in exemplary embodiments described herein are called reduction time delays and are measured, in certain exemplary embodiments, by reduction timers. The exemplary reduction time delays are any length of time that is shorter than the internal time delays. For example, a reduction time delay may be one second. The reduction time delays may be adjusted, based at least in part on the configuration of the corresponding switch (e.g., the switch A 150). For example, the corresponding switch can cause the reduction time delay to be bypassed (when the switch is deactivated or off) or any amount of time between one second and one minute.

Other timers, aside from reduction timers, tracking other time delays, other than reduction time delays, may also exist in an occupancy sensor 110. For example, a calibration timer may be used to compare a sample period of time (e.g., one millisecond) and compare the measure of that sample period of time with a measure over the same period of time with a different timer, such as a reduction timer or an internal timer. If the two measures are different, then the microprocessor 120 calibrates the different timer appropriately so that the calibrated different timer measures periods of time, such as a reduction time delay or an internal time delay, more accurately.

With some exemplary occupancy sensors 102, the internal time delay and/or the grace time delay is capable of being adjusted, automatically and/or manually. Automatic adjustments to the internal time delay and/or grace time delay may be based on one or more of a number of factors, including but not limited to a passage of time, a number of false-off signals sent by the occupancy sensor, a time of day, and a day of the week. In certain exemplary embodiments, the occupancy sensor 110 includes a range of internal time delays and/or grace time delays (e.g., between 5 minutes and 30 minutes), and so in such a case adjustments to the internal time delay and/or grace time delay are made within this range.

The power pack output 140 is communicably coupled to the power pack 180. The exemplary power pack output 140 sends one or more signals to, and/or receives one or more signals from, the power pack 180 to notify the power pack 180 as to an occupancy condition in the space 102. For example, when the occupancy sensor 110 detects occupancy in the space 102, the power pack output 140 of the occupancy sensor 110 sends a signal to the power pack 180 to notify the power pack 180 that one or more lights in the space 102 needs to be turned on. In response to receiving the signal from the power pack output 140, the power pack 180 turns on the lights in the space 102. As another example, when the occupancy sensor 110 no longer detects occupancy in the space 102, the power pack output 140 of the occupancy sensor 110 sends a signal to the power pack 180 to notify the power pack 180 that one or more lights in the space 102 needs to be turned off. In response to receiving the signal from the power pack output 140, the power pack 180 turns off the lights in the space 102.

In certain exemplary embodiments, the occupancy sensor 110 has more than one power pack output 140. For example, the occupancy sensor 110 may have a different power pack output 140 for different operating modes. In such an exemplary embodiment, the occupancy sensor 110 operates in an "occupancy plus daylight" mode during daylight hours and in an "occupancy only" mode during nighttime hours. In such a case, the occupancy sensor 110 has a different power pack output 140 for each mode. When the exemplary occupancy sensor 110 has multiple power pack outputs 140, all of the power pack outputs 140 or one or more select power pack outputs 140 (as selected, for example, by a user, by default, based on which power pack output 140 is active, and/or using some other method) are controlled by the Switch A 150.

In addition to the power pack 180, the exemplary power pack output 140 can also, or in the alternative, be communicably coupled to the BAS 170. In such a case, the power pack output 140 sends one or more signals to, and/or receives one or more signals from, the BAS 170 to notify the BAS 170 as to an occupancy condition in the space 102.

In certain exemplary embodiments, the power pack 180 is communicably coupled to the occupancy sensor 110, the BAS 170, and one or more devices 190. The power pack 180 provides an operating voltage (e.g., 24 V DC) to one or more occupancy sensors (e.g., occupancy sensor 110). The operating voltage provided by the power pack 180 to the occupancy sensor 110 may be categorized as a Class II voltage, as classified by the National Electric Code. In such a case, the voltage output of the power pack 180 is limited to 60 VDC or 100 VA. In certain exemplary embodiments, the power pack 180 communicates with one or more occupancy sensors simultaneously and, based on such communication, controls, directly or indirectly, one or more devices 190. The exemplary power pack 180 includes a transformer and at least one relay (both not shown). The transformer is used to provide an appropriate amount of operating power to the occupancy sensor 110. The relay is used to control the devices 190. A relay may be a normally-open relay, a normally-closed relay, or any combination thereof. The exemplary power pack 180 is known by one or more other names, including but not limited to a switchpack and a control pack.

The exemplary power pack 180 is capable of controlling one or more devices 190 in a limited space (e.g., the space 102). Like the occupancy sensor 110, the power pack 180 include, in certain exemplary embodiments, one or more timers that measure one or more time delays. Examples of the time delay for the power pack 180 include an amount of time that the power pack 180 waits, after receiving a signal from the occupancy sensor 110, that the space 102 is unoccupied, or ceasing to receive a signal from the occupancy sensor 110 that the space 102 continues to be occupied, before terminating power to a device 190 (e.g., turning off a bank of lights).

With certain exemplary power packs 180, the time delay of the power pack 180 is adjusted automatically and/or manually. Automatic adjustments to a time delay of the power pack 180 may be based on one or more of a number of factors, including but not limited to a passage of time, a number of false-off signals sent by the power pack 180, a time of day, and a day of the week. The exemplary power pack 180 is capable of a range of time delays (e.g., between 1 second and 30 minutes), and so in such a case adjustments to the time delay of the power pack 180 are made within this range. The time delay of the occupancy sensor 110 is added to the time delay of the power pack 180 and/or BAS 170, and so one or more devices 190 continue to receive power for periods of time (substantially equal to the sum of the appropriate time delay of the occupancy sensor 110 and the corresponding time delay of the power pack 180) after the space 102 is no longer occupied.

The optional BAS relay 145, if present, is communicably coupled to the BAS 170. The exemplary BAS relay 145 sends one or more signals to, and/or receives one or more signals from, the BAS 170 to notify the BAS 170 as to an occupancy condition in the space 102. For example, when the occupancy sensor 110 detects occupancy in the space 102, the BAS relay 145 sends a signal to the BAS 170 to notify the BAS 170 that the air conditioning in the space 102 needs to be turned on. In response to receiving the signal from the BAS relay 145, the BAS 170 turns on the air conditioning in the space 102. As another example, when the occupancy sensor 110 no longer detects occupancy in the space 102, the BAS relay 145 sends a signal to the BAS 170 to notify the BAS 170 that the heating in the space 102 needs to be turned off. In response to receiving the signal from the BAS relay 145, the BAS 170 turns off the heating in the space 102. In certain optional embodiments, the BAS relay 145 is communicably coupled to the power pack 180.

In certain exemplary embodiments, the occupancy sensor 110 has more than one BAS relay 145. For example, the occupancy sensor 110 has a different BAS relay 145 for different operating modes. For example, for occupancy sensor 110 that operate in an "occupancy plus daylight" mode during daylight hours and in an "occupancy only" mode during nighttime hours, the occupancy sensor 110 has a different BAS relay 145 for each mode. When the occupancy sensor 110 has multiple BAS relays 145, all of the BAS relays 145 or select BAS relays 145 (as selected, for example, by a user, by default, based on which power pack output 140 is active, and/or using some other method) are controlled, for example, by the Switch B 155.

In certain exemplary embodiments, the BAS 170 is communicably coupled to the occupancy sensor 110 and one or more devices 190. The BAS 170 provides, in addition to or instead of the power pack 180, an operating voltage (e.g., 10 V DC, 24 V DC, 30 V DC) to one or more occupancy sensors 110. The operating voltage provided by the BAS 170 to the occupancy sensor 110 may be categorized as a Class II voltage, as described above. In certain exemplary embodiments, the BAS 170 communicates with one or more occupancy sensors 110 simultaneously and, based on such communication, controls, directly or indirectly, one or more devices 190. In addition, or in the alternative, when the BAS relay 145 is absent from the occupancy sensor 110, then the BAS relay communicates with one or more power packs 180 simultaneously and, based on such communication, controls, directly or indirectly, one or more devices 190. The exemplary BAS 170 includes a transformer and at least one relay (both not shown). The transformer is used to provide an appropriate amount of operating power to the occupancy sensor 110. The relay is used to control the one or more devices 190. A relay may be a normally-open relay, a normally-closed relay, or any combination thereof.

In certain exemplary embodiments, the BAS 170 controls the same device 190 controlled by the power pack 180, but over a larger space than the space 102 controlled by the power pack 180. In addition, or in the alternative, the BAS 170 controls a different device 190 than the device 190 controlled by the power pack 180, independent of the space 102. An occupancy sensor 110 may communicate (e.g., send and/or receive signals) directly with the BAS 170, in addition to or instead of the power pack 180.

Like the occupancy sensor 110 and the power pack 180, the exemplary BAS 170 also includes one or more timers that measure one or more time delays. Time delays for the BAS 170 include, for example, an amount of time that the BAS 170 waits, after receiving a signal from the occupancy sensor 110 and/or the power pack 180, that the space 102 is unoccupied, or ceasing to receive a signal from the occupancy sensor 110 and/or the power pack 180, that the space 102 is still occupied, before terminating power to a device 190 (e.g., turning off a HVAC unit that supplies HVAC services to the space 102).

For certain exemplary BASs 170, the time delay is adjustable, automatically and/or manually. Automatic adjustments to the time delay of the BAS 170 is typically based on one or more of a number of factors, including but not limited to a passage of time, a number of false-off signals sent by the BAS 170, a time of day, and a day of the week. The BAS 170 is capable of a range of time delays (e.g., between 1 second and 30 minutes), and so in such a case adjustments to the time delay of the BAS 170 are made within this range. The time delay of the occupancy sensor 110 and/or the power pack 180 is added to the corresponding time delay of the BAS 170, and so one or more devices 190 continue to receive power for periods of time after the space 102 is no longer occupied.

The exemplary switch A 150 and the exemplary switch B 155 are communicably coupled to the microprocessor 120. The switch A 150 and the switch B 155 are enabled when a particular setting on the switch A 150 and the switch B 155, respectively, is received. The switch A 150 and the switch B 155, when enabled, limit the amount of time that a signal is sent to the power pack 180 from the power pack output 140 and to the BAS 170 from the BAS relay 145, respectively.

As a specific example, switch A 150, when enabled, instructs the microprocessor 120 to initiate a reduction timer when an occupation condition is detected by one of the sensors 130. The reduction timer measures a reduction time delay (e.g., one second). When the reduction timer starts, the power pack output 140 is activated. During the reduction time delay, the power pack output 140 sends a signal to the power pack 180 to inform the power pack 180 of the occupancy condition. When the reduction time delay expires, the power pack output 140 is deactivated, which terminates the signal sent by the power pack output 140 to the power pack 180 to notify the power pack 180 of the occupancy condition.

As another specific example, when the optional switch B 155 is enabled, the switch B 155 instructs the microprocessor 120 activate and deactivate the BAS relay 145 in the same way (and at the same time) that the microprocessor 120 activates and deactivates the power pack output 140 when the switch A is enabled. In such a case, when the reduction timer starts, the BAS relay 145 and the power pack output 140 are activated. During the reduction time delay, the BAS relay 145 sends a signal to the BAS 170, in the same way that the power pack output 140 sends a signal to the power pack 180, to inform the BAS 170 of the occupancy condition. When the reduction time delay expires, the BAS relay 145 and the power pack output 140 are deactivated, which terminates the signal sent by the BAS relay 145 to the BAS 170 to notify the BAS 170 of the occupancy condition.

Likewise, when the switch A 150 is enabled, the switch A 150 instructs the microprocessor 120 activate and deactivate the power pack output 140 in the same way (and at the same time) that the microprocessor 120 activates and deactivates the BAS relay 145 when the switch B 155 is enabled. In such a case, when the reduction timer starts, the BAS relay 145 and the power pack output 140 are activated. During the reduction time delay, the power pack output 140 sends a signal to the power pack 180, in the same way that the BAS relay 145 sends a signal to the BAS 170, to inform the power pack 180 of the occupancy condition. When the reduction time delay expires, the BAS relay 145 and the power pack output 140 are deactivated, which terminates the signal sent by the power pack output 140 to the power pack 180 to notify the power pack 180 of the occupancy condition.

Alternatively, when the switch B 155 is enabled, the switch B 155 may instruct the microprocessor 120 to initiate a reduction timer (either the same reduction timer or a different reduction timer than described above with respect to the switch A 150) when an occupation condition is detected by one of the sensors 130. When the reduction timer starts to measure the reduction time delay, the BAS relay 145 is activated. During the reduction time delay, the BAS relay 145 sends a signal to the BAS 170 to inform the BAS 170 of the occupancy condition. When the reduction time delay expires, the BAS relay 145 is deactivated, which terminates the signal sent by the BAS relay 145 to the BAS 170 to notify the BAS 170 of the occupancy condition.

As a result, when the switch A 150 and/or the switch B 155 are enabled, the time delay of the occupancy sensor 110, which is normally dictated by the internal time delay of between 5 minutes and 30 minutes, is overridden by the reduction time delay of approximately one second. As a result, the time delay of the occupancy sensor 110 has a minimal additive impact on the corresponding time delay of the power pack 180 and/or the BAS 170. When the switch A 150 is not enabled, the power pack output 140 tracks the internal time delays. Likewise, when the switch B 155 is not enabled, the BAS relay 145 tracks the internal time delays. As a result, exemplary embodiments provide separate control of the power pack 180 and BAS 170.

In certain exemplary embodiments, the switch A 150 and/or the switch B 155 function as a toggle switch between two timers (e.g., the reduction timer and the internal timer). For example, when the switch A 150 is in a first position, the reduction timer controls the length of time that the power pack output 140 sends a signal to the power pack 180. Alternatively, when the switch A 150 is in a second position, the internal timer controls the length of time that the power pack output 140 sends a signal to the power pack 180.

The exemplary switch A 150 and/or the switch B 155 are any type of switch. For example, the switch A 150 and/or the switch B 155 may be a physical switch that is manually manipulated (e.g., enabled) by a user at the occupancy sensor 110. An example of a physical switch is a dual in-line package (DIP) switch. Alternatively, or in addition, the switch A 150 and/or the switch B 155 are program instructions (e.g., software, firmware) that are hardcoded and/or adjustable. The program instructions can be adjustable automatically, manually, and/or based on the occurrence of certain conditions. Such program instructions may reside on and/or be executed by the microprocessor 120. The switch A 150 and/or the switch B 155 are typically located within the housing of the occupancy sensor 110 and/or at some other location communicably coupled to the occupancy sensor 110.

Figure 2A:
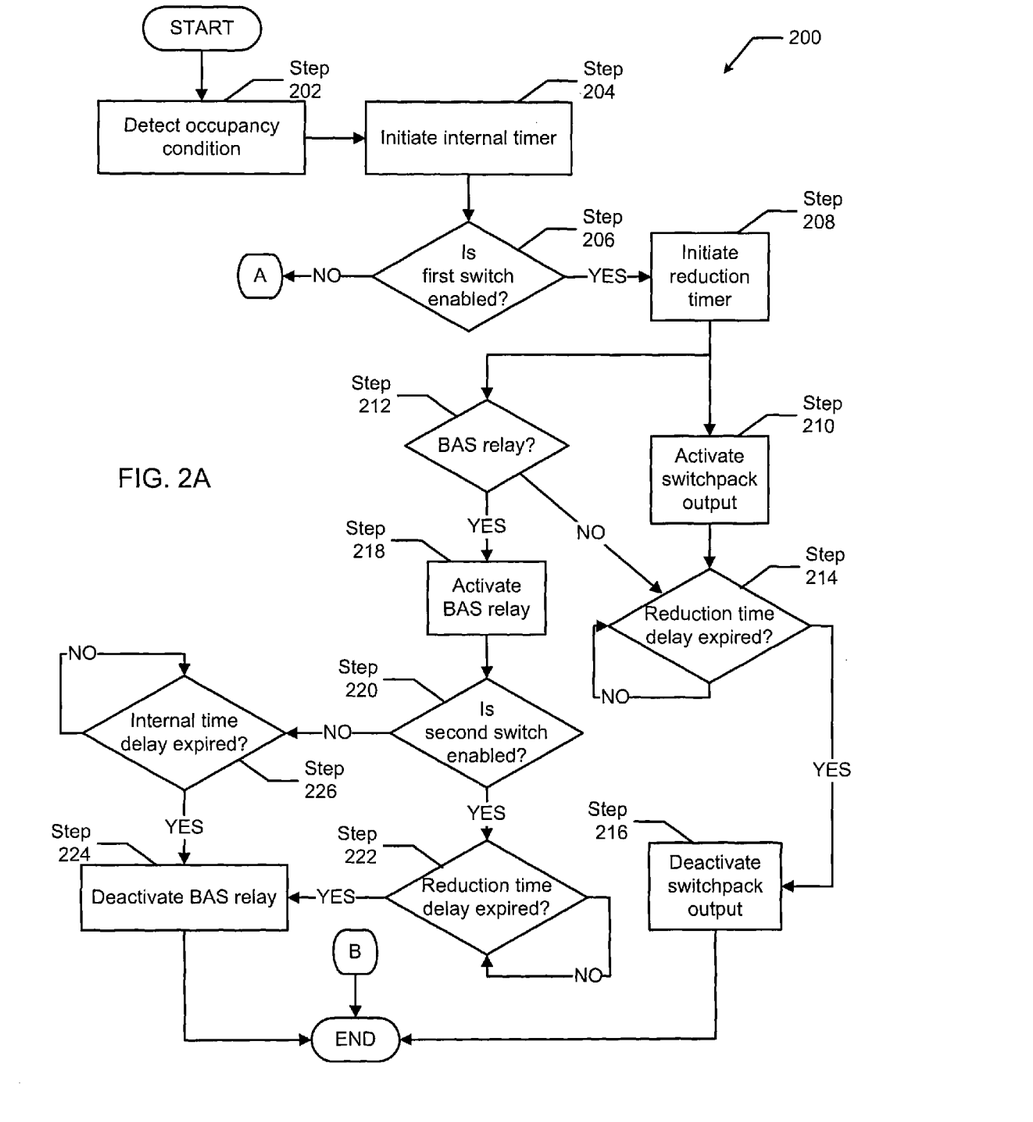
FIG. 2 is a flowchart of an exemplary method of reducing time delay for outputs of an occupancy sensor in accordance with certain exemplary embodiments.

FIG. 2 is a flowchart of a method 200 for reduced time delay for outputs of an occupancy sensor in accordance with certain exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments, one or more of the steps described below may be omitted, repeated, and/or performed in a different order. In addition, a person of ordinary skill in the art will appreciate that additional steps not shown in FIG. 2, may be included in performing this method. Accordingly, the specific arrangement of steps should not be construed as limiting the scope. In addition, a particular computing device, as described, for example, in FIG. 3 below, may be used to perform one or more of the steps for the method 200 described below.

Now referring to FIGS. 1 and 2, the exemplary method 200 begins at the START step and proceeds to step 202, where an occupancy condition is detected. In certain exemplary embodiments, the occupancy condition is detected by one or more sensors 130. In response to detecting the occupancy condition, the sensor 130 sends a signal to the microprocessor 120 to notify the microprocessor 120 of the occupancy condition. An internal timer is initiated, in step 204. In certain exemplary embodiments, the internal timer is initiated by the microprocessor 120 in response to receiving the occupancy condition from the sensor 130. The internal timer may be a physical timer or a virtual timer. As a virtual timer, the internal timer may be part of the microprocessor 120 and its corresponding firmware. The internal timer may be one of a number of internal timers and may be associated with the sensor 130 that detected the occupancy condition.

In step 206, a determination is made as to whether the first switch (i.e., the switch A 150) is enabled. Such a determination is made by the microprocessor 120 in certain exemplary embodiments. For example, the switch A 150 is enabled manually or, alternatively, electronically (using, for example, software) by the user and/or by the microprocessor 120. The switch A 150 is enabled when the switch A 150 is set to a particular setting. For example, the switch A 150 may be an on/off switch, in which case the switch A 150 is enabled when the switch A 150 is set to the "on" position. In certain exemplary embodiments, the switch A 150 is used to control the power pack output 140.

The switch A 150 may also be a toggle switch that allows a user to select between two timers (e.g., reduction timer and internal timer). The timer selected by the position of the switch A 150 determines the amount of time that the power pack output 140 sends a signal to the power pack 180. In other words, when the switch A 150 is in a first position, the power pack output 140 sends a signal to the power pack 180 for the reduction time delay measured by the reduction timer. When the switch A 150 is in a second position, the power pack output 140 sends a signal to the power pack 180 for the internal time delay measured by the internal timer. If the switch A 150 is enabled, then the YES branch is followed to step 208. Otherwise, the NO branch is followed to step 228.

In step 208, a reduction timer is initiated. The reduction timer may be initiated by the microprocessor 120. The microprocessor 120 initiates the reduction timer in response to receiving the occupancy condition from the sensor 130 and from determining that the switch A 150 is enabled. The reduction timer may be a physical timer or a virtual timer. As a virtual timer, the reduction timer may be part of the microprocessor 120 and its corresponding firmware. In certain exemplary embodiments, after step 208 is completed, the process simultaneously continues (or continues in parallel but not simultaneously) to step 210 and step 212. In step 210, the power pack output 140 is activated. In certain exemplary embodiments, the power pack output 140 is activated by the microprocessor 120 and sends a signal to the power pack 180 notifying the power pack 180 about the occupancy condition. If there is more than one power pack output 140, the microprocessor 120 determines which one of the power pack outputs 140 are activated.

In step 212, a determination is made as to whether there is a BAS relay 145. In certain exemplary embodiments, the microprocessor 120 determines whether there is a BAS relay 145 using one or more of a number of methods, such as sending a signal to the BAS relay 145 and receiving a reply if the BAS relay 145 is present. If there is no BAS relay 145, then the NO branch is followed to step 214. Otherwise, the YES branch is followed to step 218. In step 214, a determination is made as to whether the reduction time delay has expired. The reduction time delay is the amount of time measured by the reduction timer from step 208. In certain exemplary embodiments, the microprocessor 120 determines whether the reduction time delay has expired. The exemplary reduction time delay may be set by the microprocessor 120, by a user, by default, based on operational feedback, and/or by some other suitable method. If the reduction time delay has not expired, then the NO branch is followed back to this step 214, creating a logical loop until the reduction time delay has expired. If the reduction time delay has expired, then the YES branch is followed to step 216.

In step 216, the power pack output 140 is deactivated. In certain exemplary embodiments, the power pack output 140 is deactivated by the microprocessor 120. When deactivated, the power pack 180 no longer receives the signal from the power pack output 140 notifying the power pack 180 about the occupancy condition. As such, the time delay internal to the power pack 180 begins at the point when the power pack output 140 is deactivated. In step 218, the BAS relay 145 is activated. In certain exemplary embodiments, the BAS relay 145 is activated by the microprocessor 120. When the BAS relay 145 is activated, the BAS relay 145 sends a signal to the BAS 170 notifying the BAS 170 about the occupancy condition. In one exemplary embodiment, if there is more than one BAS relay 145, the microprocessor 120 determines which one or more of the BAS relays 145 to activate.

In step 220, a determination is made as to whether the second switch (i.e., the switch B 155) is enabled. In certain exemplary embodiments, this determination is made by the microprocessor 120. The exemplary switch B 155 can be enabled manually by a user or, alternatively, electronically by the user (using, for example, software) and/or by the microprocessor 120. The switch B 155 is enabled when the switch B 155 is set to a particular setting. For example, the switch B 155 may be an on/off switch, in which case the switch B 155 is enabled when the switch B 155 is set to the "on" position. In certain exemplary embodiments, the switch B 155 is used to control the BAS relay 145.

The switch B 155 may also be a toggle switch that allows a user to select between two timers (e.g., reduction timer and internal timer). The timer selected by the position of the switch B 155 determines the amount of time that the BAS relay 145 sends a signal to the BAS 170. In other words, when the switch B 155 is in a first position, the BAS relay 145 sends a signal to the BAS 170 for the reduction time delay measured by the reduction timer. When the switch B 155 is in a second position, the BAS relay 145 sends a signal to the BAS 170 for the internal time delay measured by the internal timer. If the switch B 155 is enabled, then the YES branch is followed to step 222. Otherwise, the NO branch is followed to step 226.

In step 222, a determination is made as to whether the reduction time delay has expired. The reduction time delay in this step 222 may be the same or different than the reduction time delay described above with respect to step 214. In other words, the reduction time delay may be measured by the reduction timer of step 208 or a different reduction timer. In certain exemplary embodiments, the microprocessor 120 determines whether the reduction time delay has expired. The reduction time delay may be set by the microprocessor 120, by a user, by default, based on operational feedback, and/or by some other suitable method. If the reduction time delay has not expired, then the NO branch is followed back to this step 222, creating a logical loop until the reduction time delay has expired. If the reduction time delay has expired, then the YES branch is followed to step 224.

In step 224, the BAS relay 145 is deactivated. In certain exemplary embodiments, the BAS relay 145 is deactivated by the microprocessor 120. When the BAS relay 145 is deactivated, the BAS 170 no longer receives the signal from the BAS relay 145 notifying the BAS 170 about the occupancy condition. As such, the time delay internal to the BAS 170 begins at the point when the BAS relay 145 is deactivated. The process then continues to the END step.

In step 226, a determination is made as to whether the internal time delay has expired. The internal time delay is the amount of time measured by the internal timer from step 204. In certain exemplary embodiments, the microprocessor 120 determines whether the internal time delay has expired. The internal time delay may be set by the microprocessor 120, by a user, by default, based on operational feedback, and/or by some other suitable method. If the internal time delay has not expired, then the NO branch is followed back to this step 226, creating a logical loop until the internal time delay has expired. If the internal time delay has expired, then the YES branch is followed back to step 224.

Figure 2B:
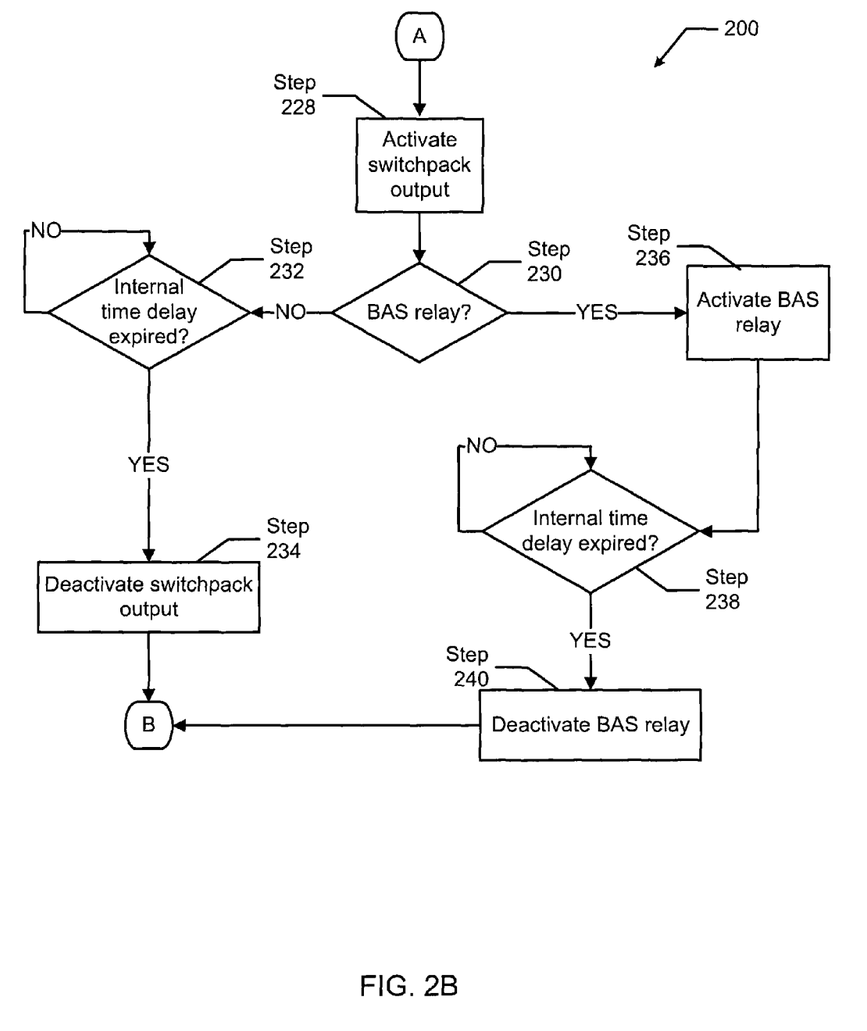

Returning to the NO branch of step 206 and referring to FIG. 2B, in step 228, the power pack output 140 is activated. This step 228 is substantially similar to step 210 described above. In step 230, a determination is made as to whether there is a BAS relay 145. This step 230 is substantially similar to step 212 described above. If there is no BAS relay 145, then the NO branch is followed to step 232. Otherwise, the YES branch is followed to step 236. In step 232, a determination is made as to whether the internal time delay has expired. This step 232 is substantially similar to step 226 described above. If the internal time delay has not expired, then the NO branch is followed back to this step 232, creating a logical loop until the internal time delay has expired. If the internal time delay has expired, then the YES branch is followed back to step 234. In step 234, the power pack output 140 is deactivated. This step 234 is substantially similar to step 216 described above. When step 234 is completed, the process continues to the END step.

In step 236, the BAS relay is activated. This step 236 is substantially similar to step 218 described above. In step 238, a determination is made as to whether the internal time delay has expired. This step 238 is substantially similar to step 226 described above. If the internal time delay has not expired, then the NO branch is followed back to this step 236, creating a logical loop until the internal time delay has expired. If the internal time delay has expired, then the YES branch is followed back to step 240. In step 240, the BAS relay 145 is deactivated. This step 240 is substantially similar to step 224 described above. When step 240 is completed, the process continues to the END step.

Figure 3:
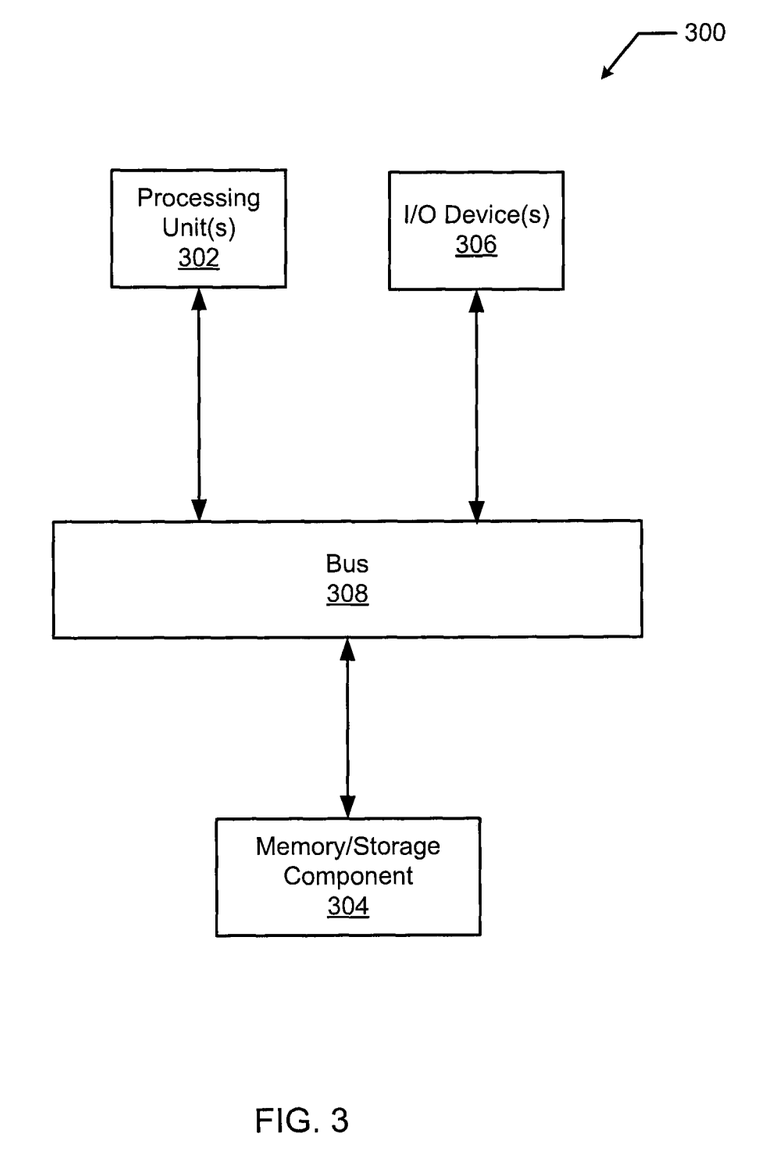
FIG. 3 shows a computer system in accordance with certain exemplary embodiments.

FIG. 3 illustrates one embodiment of a computing device 300 capable of implementing one or more of the various techniques described herein, and which may be representative, in whole or in part, of the elements described herein. Computing device 300 is only one example of a computing device and is not intended to suggest any limitation as to scope of use or functionality of the computing device and/or its possible architectures. Neither should computing device 300 be interpreted as having any dependency or requirement relating to any one or combination of components illustrated in the example computing device 300.

Computing device 300 includes one or more processors or processing units 302, one or more memory/storage components 304, one or more input/output (I/O) devices 306, and a bus 308 that allows the various components and devices to communicate with one another. Bus 308 represents one or more of any of several types of bus structures, including a memory bus or memory controller, a peripheral bus, an accelerated graphics port, and a processor or local bus using any of a variety of bus architectures. Bus 308 can include wired and/or wireless buses.

Memory/storage component 304 represents one or more computer storage media. Memory/storage component 304 may include volatile media (such as random access memory (RAM)) and/or nonvolatile media (such as read only memory (ROM), flash memory, optical disks, magnetic disks, and so forth). Memory/storage component 304 can include fixed media (e.g., RAM, ROM, a fixed hard drive, etc.) as well as removable media (e.g., a Flash memory drive, a removable hard drive, an optical disk, and so forth).

One or more I/O devices 306 allow a customer, utility, or other user to enter commands and information to computing device 300, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 300 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 300 includes at least the minimal processing, input, and/or output means necessary to practice one or more embodiments.

Further, those skilled in the art will appreciate that one or more elements of the aforementioned computer device 300 may be located at a remote location and connected to the other elements over a network. Further, certain exemplary embodiments may be implemented on a distributed system having a plurality of nodes, where each portion of the implementation (e.g., microprocessor 120, power pack output 140, BAS 170) may be located on a different node within the distributed system. In one or more embodiments, the node corresponds to a computer system. Alternatively, the node may correspond to a processor with associated physical memory. The node may alternatively correspond to a processor with shared memory and/or resources.

Exemplary embodiments described herein are directed to reducing time delays for an output of an occupancy sensor. Using exemplary embodiments, improved energy efficiency is attained because the time delay associated with an occupancy sensor is minimized when added to the time delay of one or more controlling systems (e.g., a power pack, a BAS). According to exemplary embodiments, the time delays for an output of an occupancy sensor override an internal time delay of the occupancy sensor (including one or more components of the occupancy sensor).

Using exemplary embodiments described herein, direct control of one or more occupancy sensors is transferred to one or more other systems (e.g., power pack, BAS). Specifically, the time delay of the occupancy sensor is greatly reduced (for example, from 5-30 minutes down to about 1 second) so that such time delay does not add significantly to a subsequent time delay of a different control system for the same occupancy detection. Adjustment of the time delay of the occupancy sensor can be adjusted using a switch (e.g., a DIP switch), where the switch can be controlled manually at the occupancy sensor, using software-based commands, and/or automatically.

When an occupancy sensor has multiple outputs, the time delay of each output may be selectively, or collectively, reduced using exemplary embodiments described herein. In such a case, certain systems targeted for increased energy and operational efficiency may be targeted.

Because of the ease with which a user can control the time delays of an output of an occupancy sensor using exemplary embodiments described herein, the user may be able to more easily institute energy efficiency measures. In addition, using exemplary embodiments described herein does not alter (or minimally alters) the footprint of the occupancy sensor, the software/firmware of the microprocessor, and/or any other aspect of the occupancy sensor.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the present invention is not limited herein.

We claim:

1. A method for reducing a time delay for an output of an occupancy sensor comprising the steps of:
   receiving a first setting for a reduction timer;
   detecting, with the occupancy sensor, each occupancy condition within a space;
   initiating the reduction timer and an internal timer for the occupancy sensor based on the detection of each occupancy condition, wherein the reduction timer measures a reduction time period, and wherein the internal timer measures an internal time period for the occupancy sensor;
   activating, during the reduction time period, a power pack output, wherein the power pack output activates a system timer of a power pack while activated; and
   deactivating, when the reduction time period expires, the power pack output, wherein the power pack output deactivates the system timer of the power pack while deactivated, wherein the pack controls at least one device based on the system timer.

2. The method of claim 1, wherein the reduction time period is less than the internal time period.

3. The method of claim 1, further comprising the step of sending, while the power pack output is activated, a first signal to the power pack, wherein the power pack controls a first energy-consuming device in the space.

4. The method of claim 3, further comprising:
   terminating, when the power pack output is deactivated, the first signal to the power pack.

5. The method of claim 3, wherein the first energy-consuming device comprises a luminaire.

6. The method of claim 1, further comprising:
   receiving a second setting of a second switch;
   activating, while the reduction timer is running and the second switch is in the second setting, a building automation system (BAS) output; and
   deactivating, when the reduction timer stops running, the BAS output.

7. The method of claim 6, further comprising:
   receiving a third setting for the second switch;
   activating, while the internal timer is running and the second switch is in the third setting, the BAS output.

8. The method of claim 6, further comprising:
   sending, while the BAS output is activated, a first signal to a BAS, wherein the BAS controls at least one energy-consuming device in a plurality of spaces.

9. The method of claim 1, wherein the reduction timer is set for approximately one second.

10. The method of claim 1, wherein each occupancy condition is based on a detection of a motion within the space.

11. The method of claim 1, wherein each occupancy condition is based on a detection of heat generated by an object within the space.

12. A method for adjusting a time delay for an output of an occupancy sensor comprising the steps of:
   providing a reduction timer;
   providing an internal timer of the occupancy sensor;
   receiving a first setting of a switch;
   detecting, with the occupancy sensor, a first occupancy condition of a plurality of occupancy conditions within a space;
   initiating, based on the first setting of the switch and on detecting the first occupancy condition within the space, the reduction timer and the internal timer of the occupancy sensor, wherein the reduction timer measures a reduction time period;
   activating, during the reduction time period, a power pack output, wherein the power pack output activates a system timer of a power pack while activated; and
   deactivating, when the reduction time period expires, the power pack output, wherein the power pack output deactivates the system timer of the power pack while deactivated,
   wherein the power pack controls at least one device based on the system timer.

13. The method of claim 12, further comprising the steps of:
   receiving a second setting of the switch;
   detecting, with the occupancy sensor, a second occupancy condition of the plurality of occupancy conditions within the space;
   initiating, based on the second setting of the switch and on detecting the second occupancy condition within the space, the internal timer, wherein the internal timer measures an internal time period;
   activating, during the internal time period, the power pack output; and
   deactivating, when the internal time period expires, the power pack output.

14. An occupancy sensor, comprising:
   a housing;

a processor disposed within the housing;
a sensor communicably coupled to the processor and at least partially disposed within the housing, wherein the sensor detects each occupancy condition within a space;
a first switch disposed within the housing and communicably coupled to the processor, said first switch comprising a first position and a second position;
a reduction timer disposed within the housing and communicably coupled to the processor, wherein the reduction timer is enabled upon each occupancy condition when the first switch is in the first position and disabled when the first switch is in the second position;
an internal timer disposed within the housing and communicably coupled to the processor and configured to measure an internal time period starting when each occupancy condition is detected by the sensor; and
a power pack output disposed within the housing and communicably coupled to the processor, wherein the power pack output is coupled to a power pack, wherein the power pack output activates a system timer of the power pack while the reduction timer is enabled, and wherein the power pack output deactivates the system timer of the power pack while the reduction timer is disabled, wherein the power pack controls at least one device based on the system timer.

15. The occupancy sensor of claim 14, wherein the sensor is configured to notify the processor of each occupancy condition within a space, and the power pack output is configured to send a first signal to the power pack to notify the power pack of each occupancy condition in the space.

16. The occupancy sensor of claim 14, wherein the sensor uses ultrasonic technology and infrared technology.

17. The occupancy sensor of claim 14, wherein the sensor uses microwave technology.

18. The occupancy sensor of claim 14, wherein the first switch comprises a dual in-line package (DIP) switch.

19. The occupancy sensor of claim 14, further comprising:
a second switch disposed within the housing and communicably coupled to the microprocessor and comprising a third position and a fourth position, wherein the third position enables the reduction timer, and wherein the fourth position disables the reduction timer; and
a building automation system (BAS) relay disposed within the housing and communicably coupled to the microprocessor.

20. The occupancy sensor of claim 19, wherein the microprocessor comprises the reduction timer and the internal timer.

* * * * *